United States Patent
Khosrowpour

(10) Patent No.: US 6,202,115 B1
(45) Date of Patent: *Mar. 13, 2001

(54) FAULT TOLERANT REDUNDANT BUS BRIDGE SYSTEMS AND METHODS

(75) Inventor: Farzad Khosrowpour, Lyons, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/062,279

(22) Filed: Apr. 17, 1998

(51) Int. Cl.[7] .................................................. G06F 13/00
(52) U.S. Cl. ................................................................. 710/129
(58) Field of Search ..................... 710/100–131

(56) References Cited

U.S. PATENT DOCUMENTS

| | | | |
|---|---|---|---|
| 5,387,769 | * | 2/1995 | Kupersmith et al. . |
| 5,941,951 | * | 8/1999 | Day et al. ............................. 709/233 |
| 5,991,844 | * | 11/1999 | Khosrowpour ....................... 710/129 |
| 5,991,852 | * | 11/1999 | Bagley ................................. 711/112 |

* cited by examiner

Primary Examiner—David A Wiley
(74) Attorney, Agent, or Firm—Duft, Graziano & Forest, P.C.

(57) ABSTRACT

First and second bus bridges, e.g., first and second RAID disk controllers, are operative to communicate between a first bus and a second bus via respective first and second caches and to transfer information from the first bus bridge to the second cache over a third bus, e.g., a synchronous data link between the caches, to allow recovery of data previously cached in the first cache via the second bus bridge. The second bus bridge preferably is operative to transfer information addressed to the first bus from the first bus to the second bus, e.g., to "alias" addresses normally assigned to the first bus bridge in event of a failure, disconnection or other change in status of the first bus bridge. The status may be communicated from the first bus bridge to the second bus bridge over a fourth bus connecting the first and second bus bridges. In one embodiment, the first and second bus bridges are included in respective first and second circuit assemblies that are connected to the first and second busses and to one another by a conductor assembly, e.g., a relatively high-reliability passive backplane. In yet another embodiment according to the present invention, a a respective one of the first and second circuit assemblies comprises a first circuit substrate configured to be releasably connected to the conductor assembly. The first circuit substrate is configured to receive a plurality of second circuit substrates for connecting the bus bridge of the circuit assembly to the first and second busses. In this manner, the circuit assemblies may be adapted to bridge a variety of bus types, such as low-voltage differential SCSI (LVDS), single-ended ended SCSI (SCSI-SE) and Fibre Channel (FC).

40 Claims, 9 Drawing Sheets

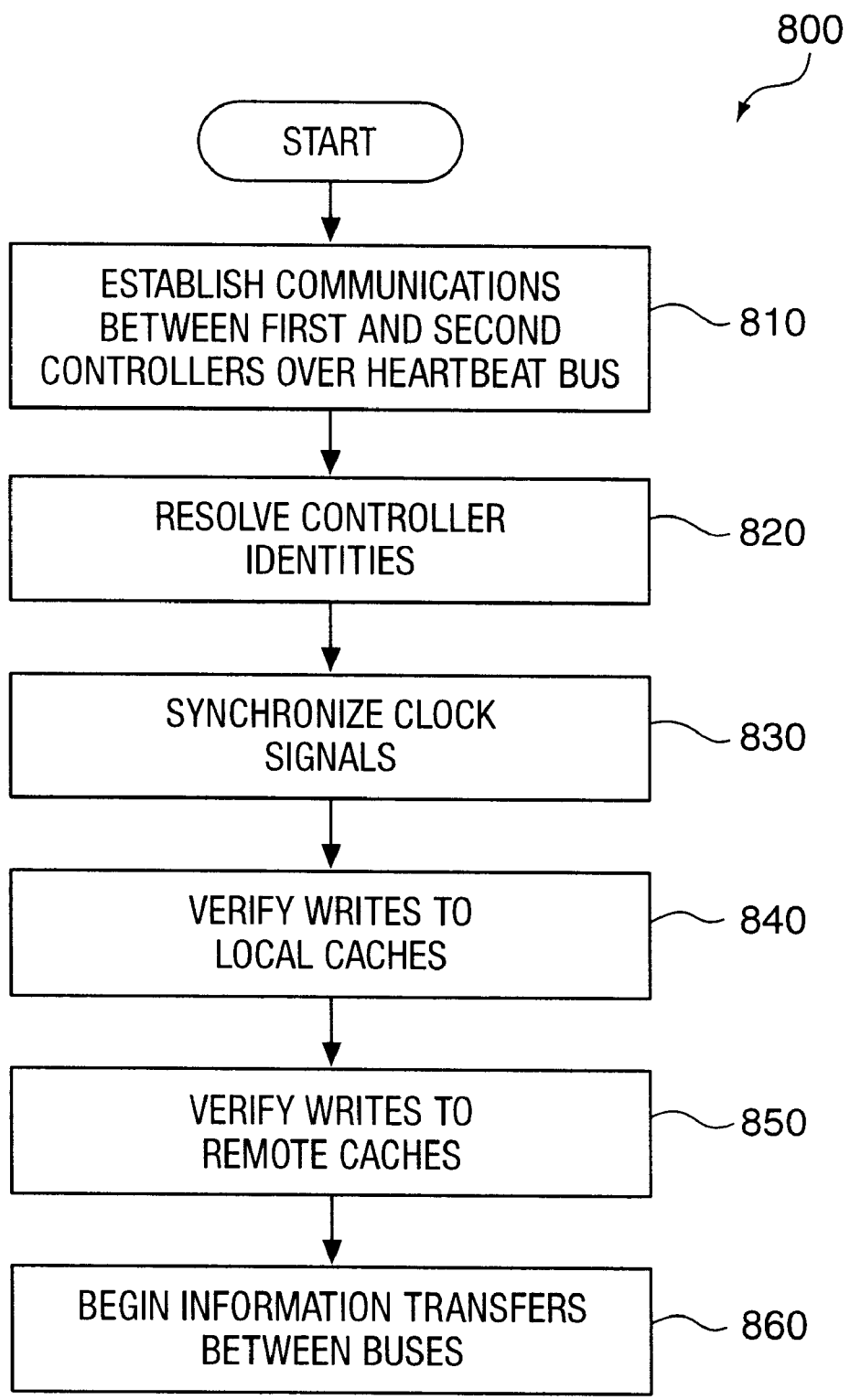

FAULT TOLERANT REDUNDANT BUS BRIDGE SYSTEMS AND METHODS

BACKGROUND OF THE INVENTION

1. Field of the Invention

The present invention relates to data communications systems and methods, and more particularly, to bus bridge systems and methods.

2. Statement of the Problem

High-bandwidth busses are typically used to communicate between hosts and peripherals in applications such as computer networks. The bus interfaces used by hosts and peripherals often take different forms depending on the performance characteristics desired. For example, host devices may communicate via a differential or single-ended Small Computer System Interface (SCSI) or a Fibre Channel (FC) interface, while a peripheral such as a disk array may utilize a SCSI or other bus interface. When hosts and peripherals use disparate bus architectures, bus bridges are often utilized to provide connectivity.

Bus bridges may also be used to increase the capacity of bus systems. Bus specifications often limit, among other things, the length of the bus and the number of devices that may be attached to the bus in order to maintain performance. For example, the Peripheral Component Interconnect (PCI) bus specification commonly employed in personal computer bus applications has detailed rules for round trip propagation delay and capacitive loading which help maintain the integrity of communications at specified bus clock rates. In order to increase the capacity of such a bus, an expanded multi-layer bus structure may be used that includes a plurality of busses connected by high-speed bus bridges. This multi-layer structure can allow an increased number of devices to be interconnected while maintaining bus performance.

Complex computer systems and networks may employ multiple hosts connected to peripherals such as mass storage devices. These devices often are connected to the hosts by multiple busses and bus bridges. Consequently, data stored on these mass storage systems may be temporarily inaccessible due to a bus bridge failure, an event that can incur significant down time costs. In addition, systems that utilize bridges with storage elements, such as caches used in for Redundant Array of Independent Disk (RAID) systems that implement data striping or mirroring across multiple disks or other storage media, may be subject to data loss or corruption if the coherence of the cache is lost due to a bridge failure. Accordingly, it is desirable to increase the reliability of bus bridges to help reduce the likelihood of information loss.

Conventional techniques for improving bus bridge reliability include using bus bridge systems with redundant bus bridges between busses. In one type of conventional system, a host monitors a bus bridge to determine its health by using messages communicated over the data path connecting the host and the bridge. If the host receives a message indicating failure of the bridge, the host may route information originally intended for the failed bridge through a redundant bridge, providing what is often referred to as host-managed "failover" operation.

Host-managed failover can have many disadvantages, however. Host-managed systems tend to be operating system dependent. The reliability of a host-manage failover approach may also be compromised by relatively high failure rate elements, such as the host and data paths used to monitor and control the bus bridges, the failure of which can cause a complete failure of the data path through the bus bridge system. Maintaining cache coherency in host-managed systems may also undermine performance, as caching at the host level may require a high-bandwidth communications channel between hosts. Maintaining a host-based failover capability in the presence of potential host power supply failures may also be expensive, as an entire host computer may have to be maintained through a power outage event. Accordingly, there is a need for bus bridge systems and methods that can provide improved performance, reliability and data protection.

SUMMARY OF THE INVENTION

In light of the foregoing, it is an object of the present invention to provide bus bridge systems and methods that can provide increased reliability and data protection.

It is another object of the present invention to provide redundant bus bridge systems and methods that do not require host intervention.

It is another object of the present invention to provide bus bridge systems and methods that are compatible with a variety of bus architectures.

It is yet another object of the present invention to provide bus bridge systems and methods that are less operating system dependent.

According to the present invention, these and other objects, features and advantages are provided by bus bridge systems and methods in which first and second bus bridges are operative to communicate between a first bus and a second bus via respective first and second caches and to transfer information from the first bus bridge to the second cache over a third bus, e.g., a synchronous data link between the caches, to allow recovery of data previously cached in the first cache via the second bus bridge. For example, the first and second bus bridges may comprise respective first and second RAID controllers which are operative to communicate information from a host device connected to the first bus to a mass storage element connected to the second bus in a manner appropriate to implement one or more RAID levels. The second bus bridge preferably is operative to transfer information addressed to the first bus from the first bus to the second bus, e.g., to "alias" addresses normally assigned to the first bus bridge in event of a failure, disconnection or other change in status of the first bus bridge. The status may be communicated from the first bus bridge to the second bus bridge over a fourth bus connecting the first and second bus bridges. In this manner, an active/active failover capability may be provided and cached information preserved without requiring host intervention.

In one embodiment according to the present invention, the first and second bus bridges are included in respective first and second circuit assemblies that are connected to the first and second busses and to one another by a conductor assembly, e.g., a relatively high-reliability passive backplane. A respective one of the first and second circuit assemblies may be configured to be disconnected from or connected to the conductor assembly while the other of the first and second circuit assemblies maintains communication between the first bus and the second bus. Separate power supplies may be connected to each circuit assembly via the conductor assembly, and each circuit assembly may include a battery that is operative to power the bridge circuit therein responsive to a power supply failure. A redundant bus bridge system is thereby provided that can maintain communications between busses in the event of a failure of one of the bus bridges or one of the power supplies.

In another embodiment according to the present invention, the first and second caches comprise respective first and second SDRAMs. The first and second circuit assemblies comprise respective first and second clock generators that produce respective first and second clock signals. The first and second circuit assemblies are operative to synchronously transfer information from the first bus bridge to the second synchronous dynamic random access memories (SDRAMS) according to a selected one of the first and second clock signals. The conductor assembly may be configured to provide the first clock signal to the second circuit assembly, and the second circuit assembly may include a clock control circuit, responsive to the first clock signal and operative to determine a status of the first clock signal. A clock synchronizing circuit is responsive to the clock control circuit and operative to produce a clock signal synchronized to a selected one of the first and second clock signals based on the determined status of the first clock signal. Data is transferred to the second SDRAM according to the synchronized clock signal.

In yet another embodiment according to the present invention, a respective one of the first and second circuit assemblies comprises a first circuit substrate configured to be releasably connected to the conductor assembly. The first circuit substrate is configured to receive a plurality of second circuit substrates for connecting the bus bridge of the circuit assembly to the first and second busses. In this manner, the circuit assemblies may be adapted to bridge a variety of bus types, such as low-voltage differential SCSI (LVDS), singleended SCSI (SCSI-SE) and Fibre Channel (FC).

BRIEF DESCRIPTION OF THE DRAWINGS

FIGS. 8 and 9 illustrate initialization operations for a redundant bus bridge system according to aspects of the present invention.

DETAILED DESCRIPTION OF EMBODIMENTS

Figure 1:
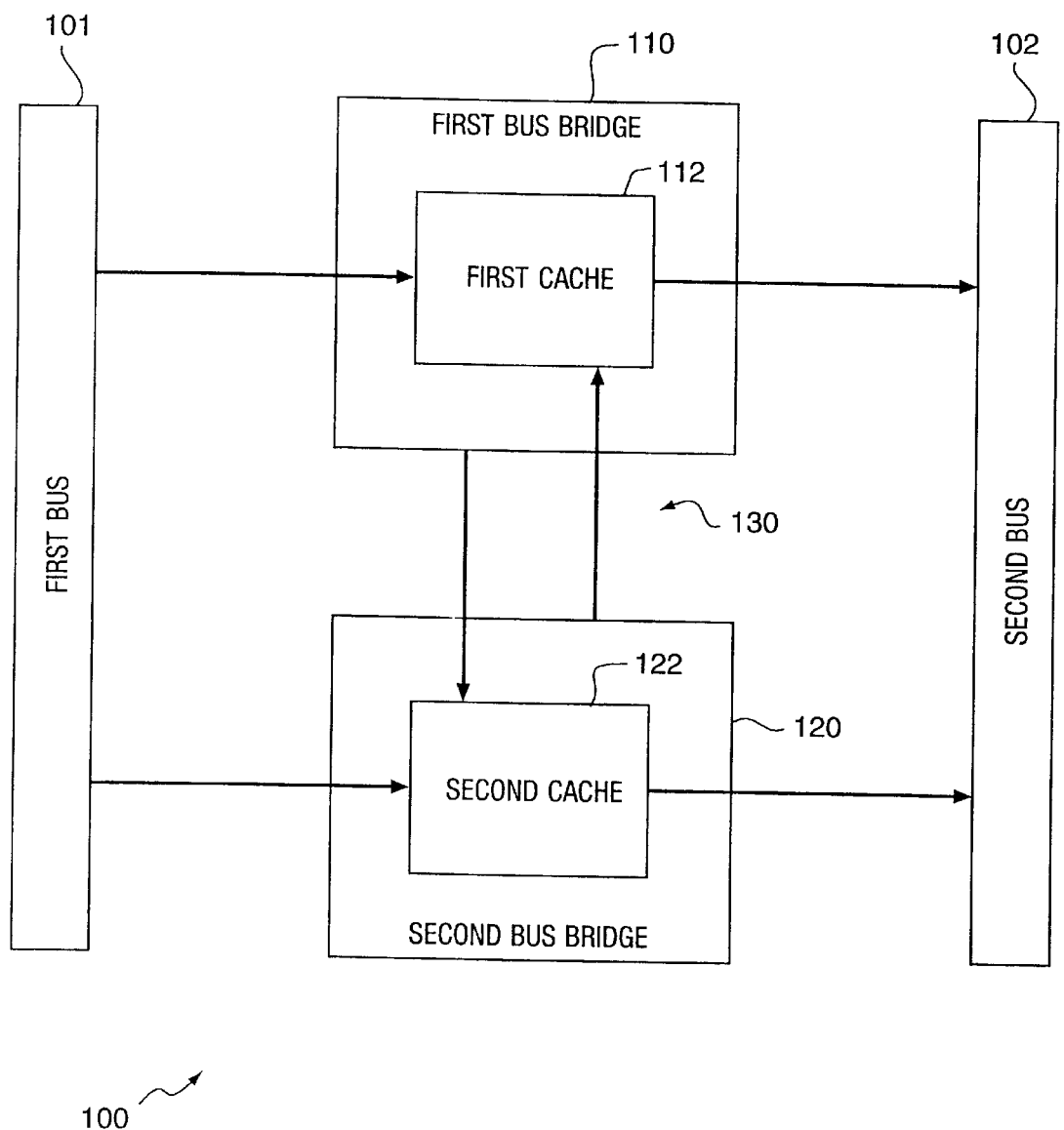
FIG. 1 illustrates an embodiment of a redundant bus bridge according to the present invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

It will be understood that as referred to herein, a "bus" may comprise a conductive, fiber optic or similar pathway for transmission of information from one location to another. For purposes of the discussion herein, busses include but are not limited to parallel and series data paths such as low-voltage differential (LVDS) or single-ended (SE) SCSI, Fibre Channel (FC) and the like. A "bus bridge" according to the present invention may include hardware or combinations of hardware and software that provide connectivity between such busses. Accordingly, a bus bridge may include intermediate busses or other data paths that are used to provide connectivity between busses; for example, embodiments are described herein that include bus bridges comprising intermediate busses, e.g., PCI busses, which are used to provide connectivity between two other types of busses, such as between a Fibre Channel "bus" and an SCSI bus.

FIG. 1 illustrates a bus bridge system 100 according to the present invention. A first bus bridge 110 is operative to communicate between a first bus 101 and second bus 102 via a first cache 105. A second bus bridge 120 is also operative to communicate between the first and second busses 101, 102 via a second cache 125. A third bus 130 connects the first and second caches 115, 125. The first bus bridge 110, the second bus bridge 120 and the third bus 130 are operative to communicate information previously cached at the first cache 115 to the second bus 102 via the second cache 125, enabling recovery of the information previously cached in the first cache 115 should the first bus bridge 110 be unable to communicate the cached information to the second bus 102.

Those skilled in the art will appreciate that the present invention is generally applicable to a wide variety of bus bridge applications. In a preferred embodiment of a bus bridge system 100 illustrated in FIG. 2, the first and second bus bridges may comprise respective first and second disk controllers 205, 206 which provide connectivity between a host, here shown as a hub 201 for a Fibre Channel (FC) "bus" 202, and a disk array 204, here shown connected to a SCSI bus 203. Preferably, information transfer between the FC bus 202 and the SCSI bus 203 occurs according to at least one of a so-called RAID "level," for example, the RAID levels described in *The RAIDbook, A Source Book for Disk Array Technology*, published by the RAID Advisory Board, St. Peter Minn. (1996).

Those skilled in the art will appreciate that the present invention may be employed to provide connectivity between busses other than FC or SCSI. It will also be understood that present invention could be used to provide bus bridge connectivity between sets of busses comprising multiple busses. For example, the SCSI bus 203 of FIG. 1 could comprise multiple busses connecting the bus bridge system 100 to a plurality of disks and/or disk arrays. In addition, it will be understood that the disk array 204 may comprise hardware, software or combinations thereof, such as an array of "physical" disks combined with one or more layers of array management software.

Figure 2:
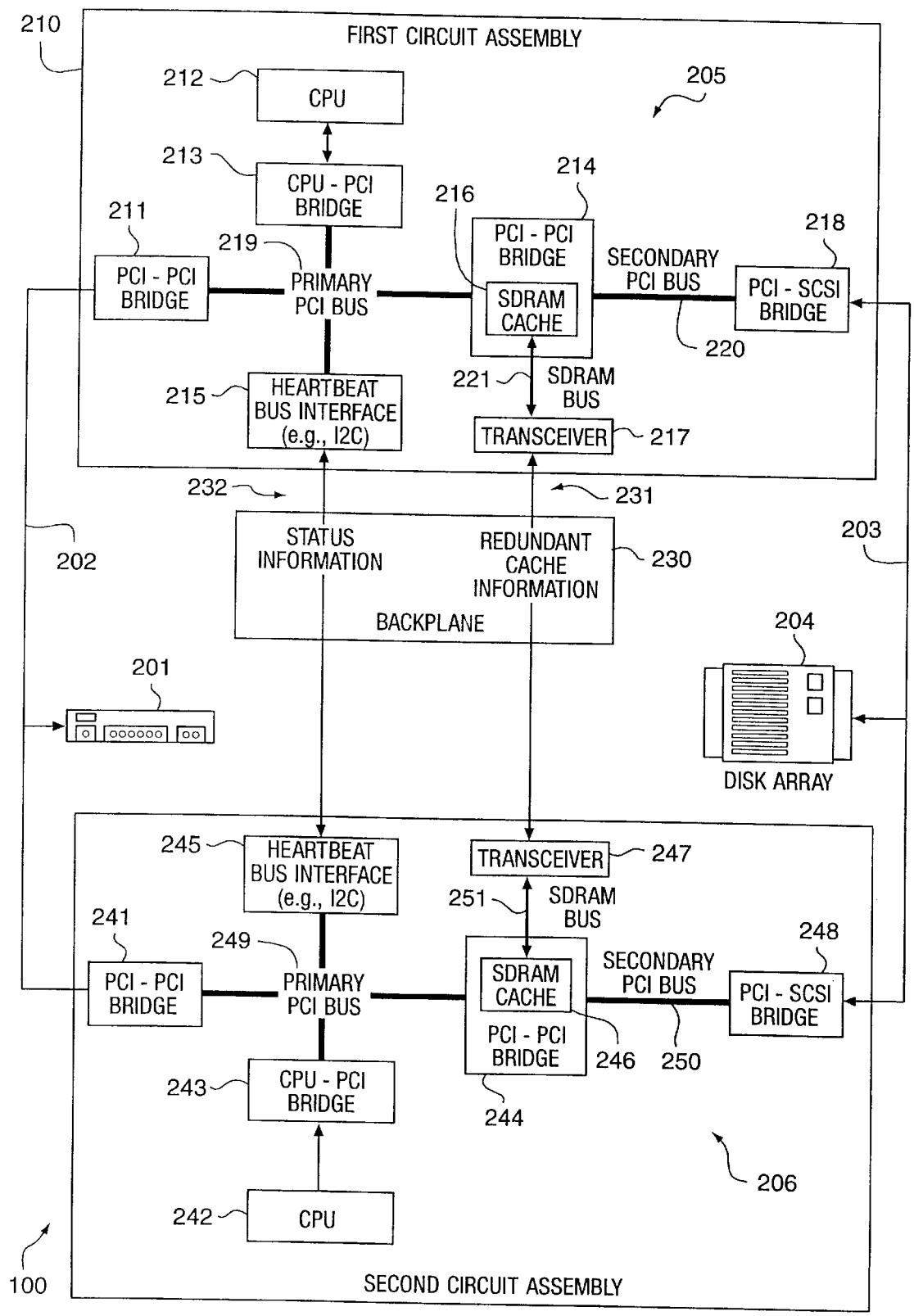
FIG. 2 illustrates an embodiment of a redundant disk controller system according to the present invention.

Still referring to FIG. 2, the first and second controllers 205, 206 are implemented on respective first and second circuit assemblies 210, 240. The first and second circuit assemblies are releasably connected to a backplane 230. In a respective one of the circuit assemblies 210, 240, a FC-PCI bridge 211, 241 provides connectivity between the FC bus 202 and a primary PCI bus 219, 249. A PCI-PCI bus bridge 214, 244 communicates information between the primary PCI bus 219, 249 and a secondary PCI bus 220, 250 via an SDRAM cache 216, 246. A PCI-SCSI bridge 218, 248 provides connectivity between the secondary PCI bus 220, 250 and the SCSI bus 203 connected to the disk array 204.

The SDRAM cache is connected to the PCI-PCI bus bridge 214, 244 by an SDRAM bus 221, 251, and caches information to be transferred between the primary PCI bus 219, 249 and the second PCI bus 220, 250. Preferably, the PCI-PCI bus bridge 214, 244 provides a bandwidth between the primary PCI bus 219, 249 and the secondary PCI bus 220, 250 that is at least as great as the maximum bandwidth of the primary PCI bus 219, 249 and the secondary PCI bus 220, 250. An example of a high-bandwidth cached bus bridge is described in U.S. patent application Ser. No. 08/829,431, filed on Mar. 31, 1997 and assigned to the assignee of the present application and herein incorporated by reference in its entirety to the same extent as if the text were physically present.

According to an aspect of the present invention, a failover bus 231 is provided between the first and second circuit assemblies 210, 240 such that the bus bridge system 100 can maintain data transfers in the event of a single fault in one of the first and second circuit assemblies 210, 240, e.g. a component failure in or removal of one of the circuit assemblies 210, 240. A respective circuit assembly 210, 240 includes a communications circuit, here shown as including a transceiver 217, 247 connected to the SDRAM bus 221, 251, such that information cached in the circuit assembly's cache may be redundantly written to the cache of the other, "remote" circuit assembly. This allows information cached in a failed or removed circuit assembly to be recovered by retrieving the redundant information from the remote cache. For example, the interface between the first and second SDRAM busses 221, 251 may mirror write-back cache between the first and second controllers 205, 206. Those skilled in the art will appreciate that the redundant information transferred to the remote cache may be written in a number of ways, e.g., according to various coding and/or compression schemes, such that the information content present in the local cache may be recovered from the remote cache. The transceivers 217, 247 may comprise low voltage bi-directional registered transceivers implemented in so-called "LCX" low-power CMOS technology, such as the QS74LCX16646 transceivers manufactured by Quality Semiconductor, Inc.

Each of the circuit assemblies 210, 240 also includes circuitry that allows the assembly to monitor the status of the other assembly. A "heartbeat" bus 232 is provided to communicate status information, such as identification or diagnostic information, between the first and second circuit assemblies 210, 240, via heartbeat bus interfaces 215, 245. The heartbeat bus 232 may comprise a serial bus, for example, with the first and second heartbeat bus interfaces 215, 245 including electrically erasable programmable read-only memories (EEPROMs) which may be accessed by either of the controllers 205, 206 via the serial bus.

Communications between the SDRAM busses 221, 251 and over the heartbeat bus 232 may be controlled by central processing units (CPUs) 212, 242 on the first and second circuit assemblies 210, 240. A respective CPU 212, 242 may comprise a microprocessor, e.g., a Pentium®-class microprocessor, which communicates with devices on the primary PCI bus 219, 249 via a CPU-PCI bridge 213, 243. Examples of such CPU-PCI bridges are described in *Understanding I/O Subsystems,* published by Adaptec, Inc. (1996). The addresses of the first and second controllers 205, 206 on the heartbeat bus 232 may be set by initialization software running on the CPUs 212, 242. For example, a respective circuit assembly 210, 240 may include means, such as the CPU 212, 242 for identifying a configuration resistor (not shown) disposed on the backplane 230 and determining the identity of the slot in the backplane 230 in which the controller is plugged.

Those skilled in the art will appreciate that functions of the heartbeat bus interfaces 215, 245, the transceivers 217, 247 and associated arbitration and control functions may be integrated into one device or distributed over several devices. For example, arbitration functions associated with communications via the transceivers 217, 247 may be implemented in one or more programmable logic devices (PLDs), or could be integrated along with the transceivers 217, 247 in a larger-scale application specific device, e.g., a field programmable gate array (FPGA) such as the FPGAs manufactured by Vantis Corporation.

For the system 100 illustrated in FIG. 2, failure in one of either the first or second controllers 205, 206 does not necessarily prevent information transfer between the FC 202 and the SCSI bus 203. However, because the backplane 230 that connects the transceivers 217, 247 and the heartbeat bus interfaces 215, 245 may serve as a single point of failure (SPOF), the backplane preferably is passive, e.g., a conductor assembly without active devices which may reduce reliability. Such a backplane typically has a high mean time between failures (MTBF), and thus may not unduly diminish overall system reliability.

Figure 3:
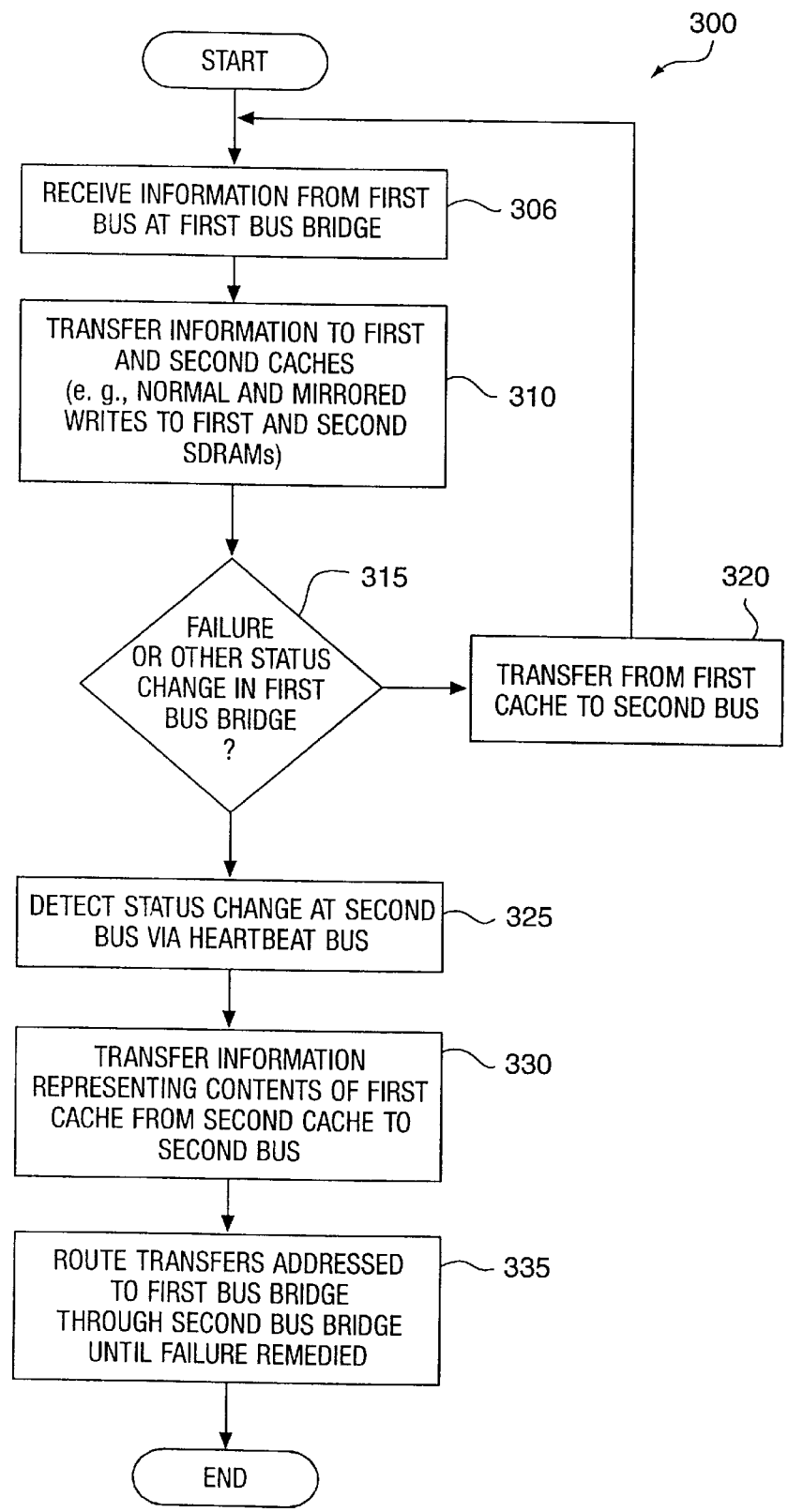
FIG. 3 illustrates operations for transferring information between busses according to an aspect of the present invention.

FIG. 3 illustrates operations 300 for providing redundant bus bridge communications according to an aspect of the present invention. Information is received from a first bus, e.g., the FC 202 of FIG. 2, at a first bus bridge of a first circuit assembly (Block 305). The received information is transferred to the cache of the first bus bridge, and to the cache of a second bus bridge on a second circuit assembly (Block 310). The latter transfer may occur, for example, by performing a "mirrored write" to an SDRAM on the second circuit assembly via an SDRAM failover interface as described with respect to FIG. 2 (Block 310).

A failure or similar status change in the first bus bridge may occur (Block 315). The failure is detected at the second bus bridge (Block 325), for example, by second bus bridge reading an address in an EEPROM associated with the first bus bridge via a heartbeat bus interface as described with respect to FIG. 2. In response, information corresponding to information cached at the first bus bridge is transferred from the second bus bridge's cache to the second bus (Block 330), allowing the information originally cached at the first bus bridge to be recovered even though the first bus bridge has failed or has been removed. Until the first bus bridge is available, information addressed to the first bus bridge may be routed through the second bus bridge (Block 335). For example, the second bus bridge may "alias" the first bus bridge's SCSI ID or FC-AL ALPA, allowing information transfer to continue in a largely transparent manner.

Figure 4:
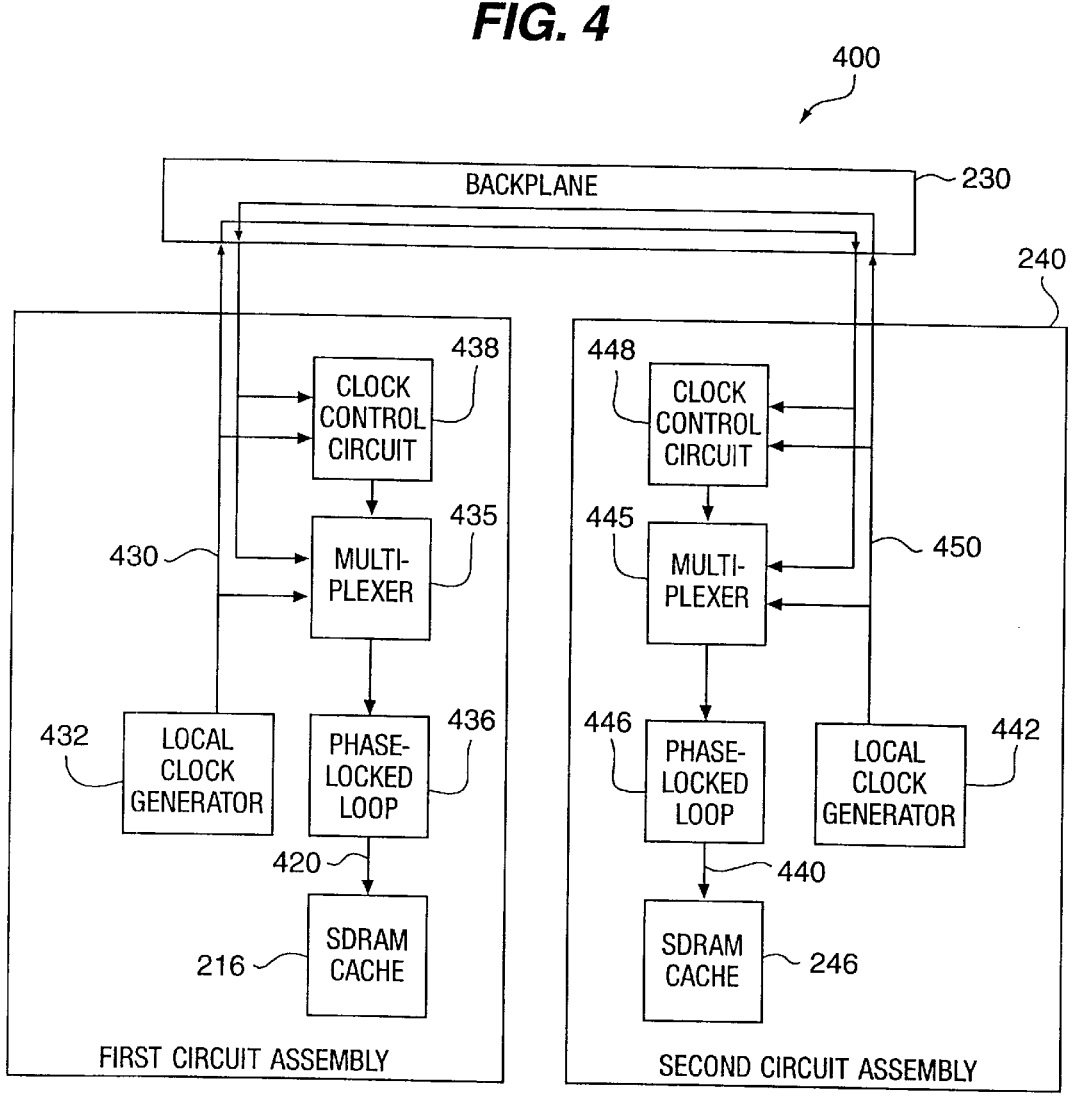
FIG. 4 illustrates clock failover in a redundant bus bridge system in another embodiment according to the present invention.

FIG. 4 illustrates an embodiment of the present invention, in particular, a system 400 for providing clock signals to operate the SDRAM caches 216, 246 on the first and second circuit assemblies 210, 240. The first and second circuit assemblies 210, 240 include respective local clock generators 432, 442 that generate respective first and second clock signals 430, 450. The first and second clock signals are routed between the first and second circuit assemblies 210, 240 via the backplane 230. In order to provide synchronous operation between the first and second SDRAM caches 216, 246 on the first and second circuit assemblies 210, 240, a clock synchronizing circuit, e.g., a multiplexer 435, 445 and phase locked loop (PLL) 436, 446, is provided that produces clock signals 420, 440 that are synchronized to a selected one of the first and second clock signals 430, 450. A clock control circuit 438, 448 may determine whether the circuit assemblies locally generated clock signal is to serve as a "primary" or a "secondary" clock signal for operation of the SDRAM caches 216, 246. If the clock control circuit 438, 448 determines that its locally generated clock signal is to serve as the primary clock signal, it switches the multiplexer 435, 445 appropriately to supply the locally generated clock signal to the PLL 436, 446. If not, the external clock signal is applied to the PLL 436, 446. The clock control circuit 438, 448 may also determine whether the external clock signal supplied from the remote circuit assembly is valid and switch the multiplexer 435, 445 to supply the locally generated clock signal to the PLL 436, 446 should the external clock signal be absent or invalid. An example of such a clock distribution scheme is described in a U.S. patent application entitled "*Redundant Bus Bridge Systems and Methods Using Selectively Synchronized Clock Signals,*" by Khosrowpour, assigned to the assignee of the present application, filed concurrently herewith and incorporated by reference herein in its entirety as if the text were physically present.

Figure 5:
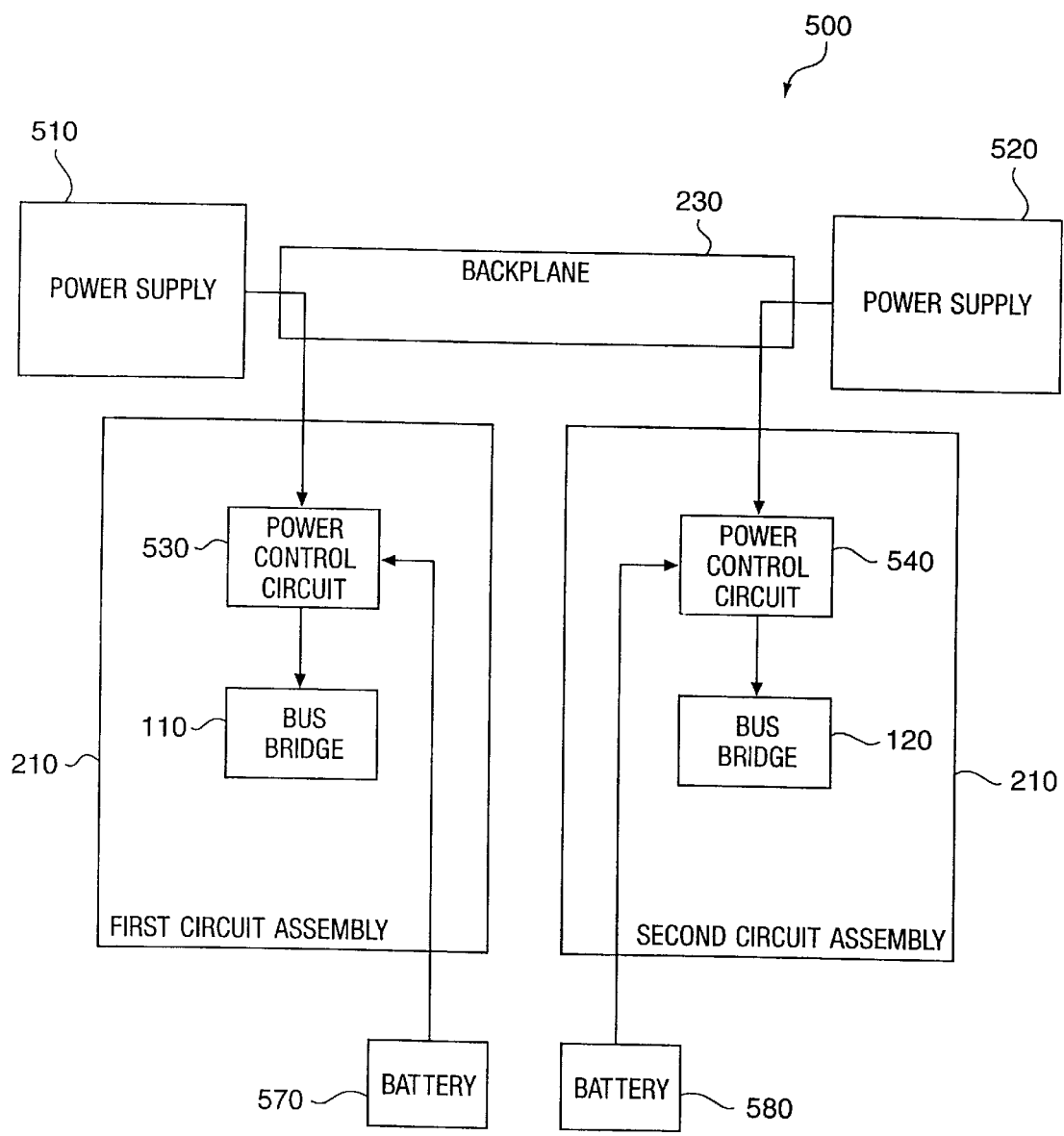
FIG. 5 illustrates power distribution in a redundant bus bridge system in another embodiment according to the present invention.

FIG. 5 illustrates an embodiment according to another aspect of the present invention. First and second power supplies 510, 520 are provided to independently supply power to the first and second circuit assemblies 210, 240 via the backplane 230. Should one of the first or second power supplies 510, 520 fail, the bus bridge powered by the remaining operational supply may continue operation in a transparent fashion, taking over data transfers normally performed by the bus bridge powered by the failed supply using a failover procedure as described above. An example of such a power distribution scheme is described in a U.S. patent application entitled "*Redundant Bus Bridge Systems and Methods Using Separately-Powered Bus Bridges,*" by Khosrowpour, assigned to the assignee of the present application, filed concurrently herewith and incorporated by reference herein as if the text were physically present.

A respective one of the circuit assemblies incorporates a power control circuit 530, 540 that selectively supplies power to the associated bus bridge 110, 120 from the associated power supply 510, 520 or a battery 570, 580. Although separate batteries 570, 580 are shown connected to the first and second circuit assemblies 210, 240 independent of the backplane 230, battery backup may be supplied from a single source and/or through the backplane 230. Those skilled in the art will appreciate that the power control circuits 530, 540 may be implemented using a number of well-known circuits which sense failure of a main power source and automatically switch over to a battery backup.

Figure 6:
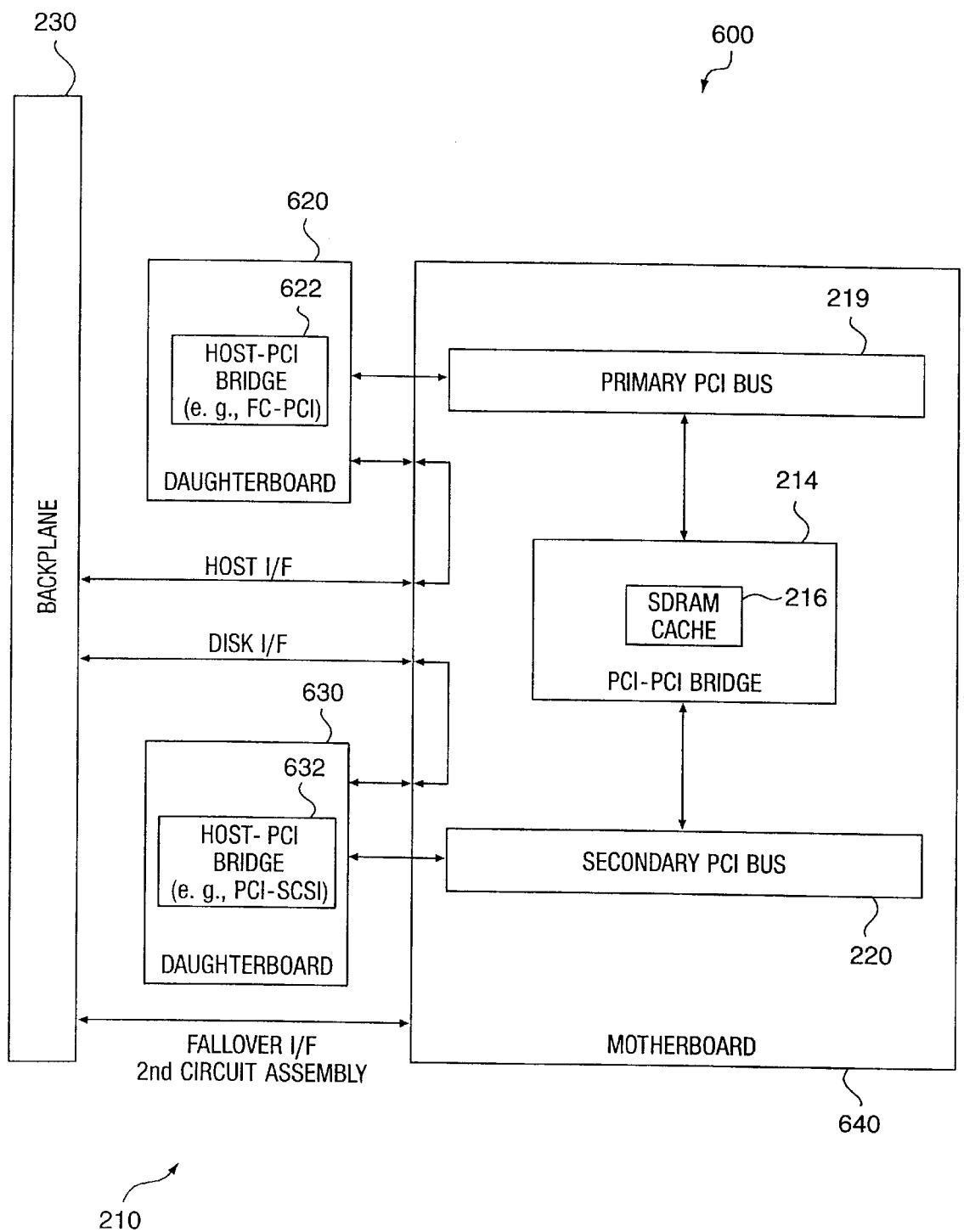
FIGS. 6 and 7A–B illustrate a modular redundant bus bridge system in another embodiment according to the present invention.
Figure 7A:
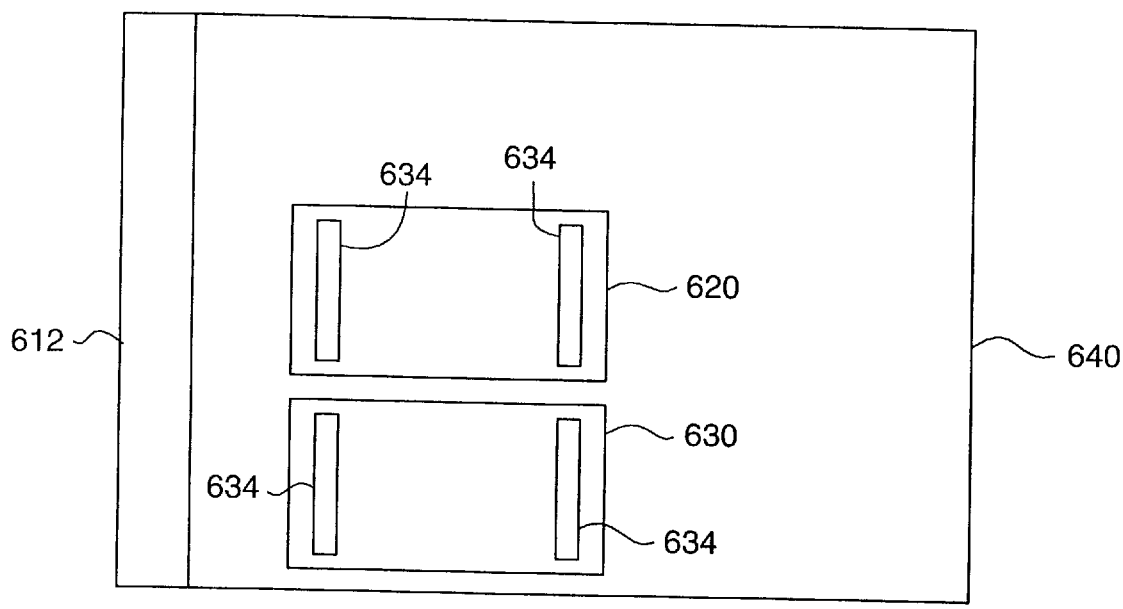
Figure 7B:
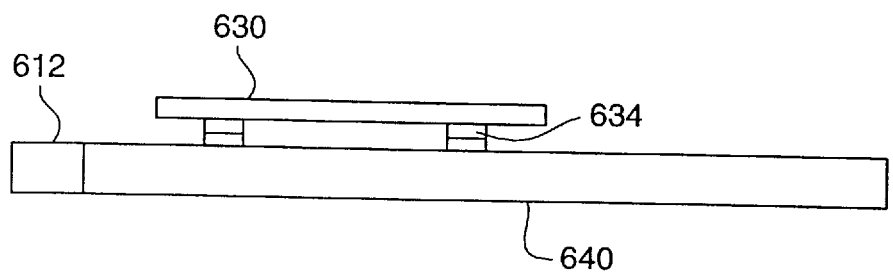

FIGS. 6 and 7A–B illustrate yet another exemplary embodiment according to the present invention, in which a modular architecture 600 is used in a bus bridge circuit assembly 210 to provide flexible connectivity to a variety of different bus combinations. Primary and secondary PCI busses 219, 220, a PCI-PCI bridge 214 with cache 216 are formed on a first circuit substrate, e.g., a motherboard 640 that is configured to releasably connect to a backplane 230 via a backplane connector 612. Second circuit substrates, e.g., daughterboards 620, 630, provide connectivity to first and second busses; for example, a first daughterboard 620 may provide a host-PCI bridge 622 such as the FC-PCI bridge of FIG. 2, while a second daughterboard 630 may provide a PCI-disk bridge 632 such as the PCI-SCSI bridge of FIG. 2. As illustrated in FIGS. 7A–B, the daughterboards 620, 630 may be releasably connected to the motherboard 640 in a mezzanine configuration using connectors 634 having portions mounted on the daugterboard 620, 630 and the motherboard 640, apart from the backplane connector 612. Those skilled in the art will appreciate that the present invention may be used to provide connectivity between a wide variety of devices and in a variety of bus configurations other than that illustrated in FIG. 6. For example, the modular architecture according to the present invention could be to provide host-to-host or disk-to-disk connectivity.

FIG. 8 illustrates operations 800 for initiating information transfers using a redundant bus bridge system, e.g., a system including first and second RAID disk controllers as illustrated in FIG. 2. Communications are established between the first and second controllers through a heartbeat bus (Block 810). The first and second controller identities are resolved, for example, by reading information stored in EEPROMs on the controllers which identify the controller's slot location on the backplane for later use in clock and other failover operations (Block 820). With the controller identities resolved, the clock signals for the SDRAMs of the first and second controllers may be synchronized to the appropriate clock (Block 830). Each controller then performs a diagnostic write and read back to its local cache to verify its operation (Block 840). Each controller then performs a "broadcast" write to the remote cache SDRAM over the SDRAM interface, reading back the information written to the remote cache over the heartbeat bus to verify operation of the SDRAM interface (Block 850). After verification of the operation of the SDRAM interface, data transfers across the controllers may begin (Block 860).

Figure 9:
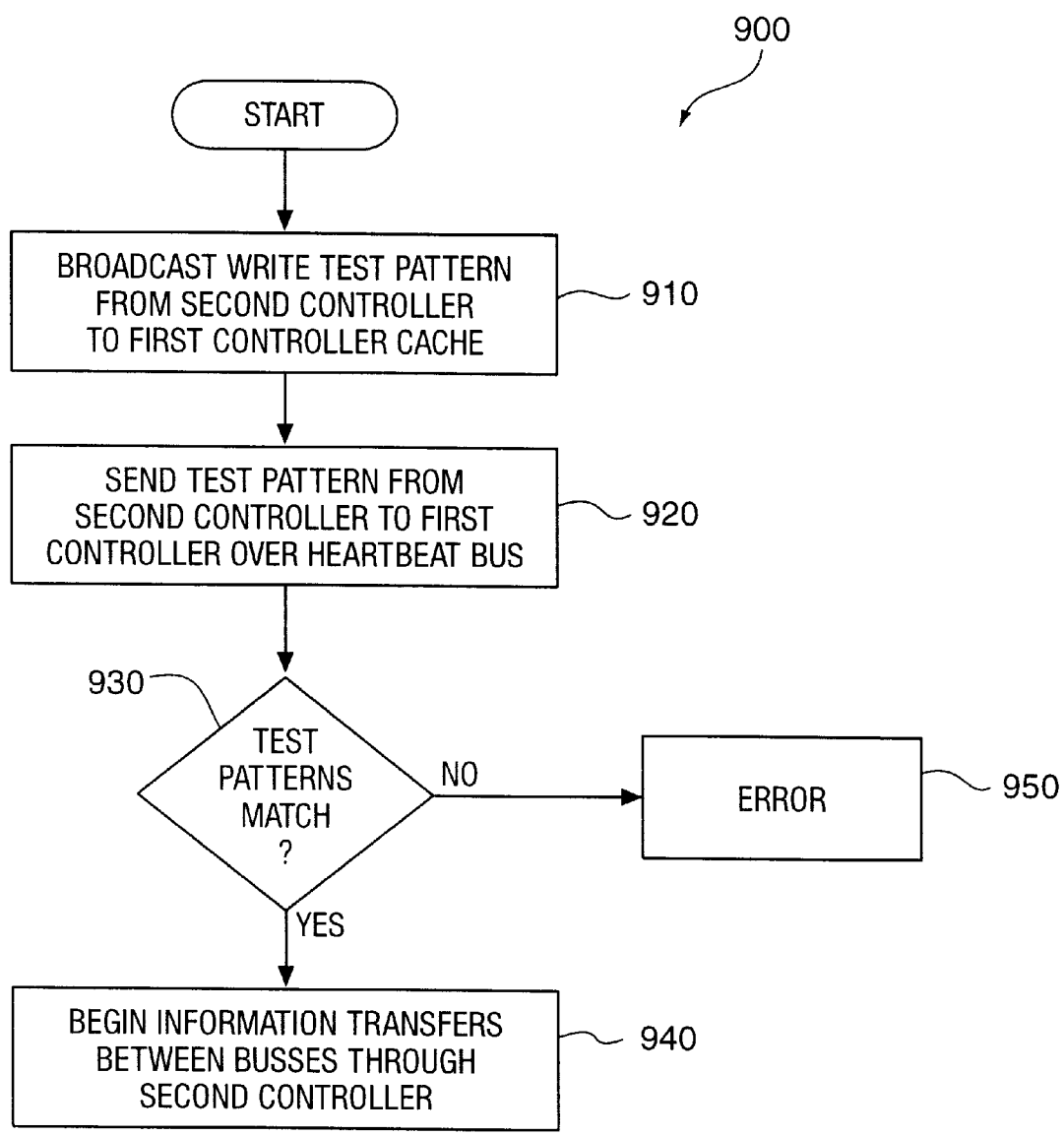

FIG. 9 illustrates detailed operations 900 for verifying operation of the SDRAM interface between first and second controllers. A broadcast write is performed from the first controller to the second controller using, for example, an appropriate test pattern (Block 910). The test pattern is then read from the remote cache, and transferred from the second controller to the first controller over the heartbeat bus (Block 920). If the test patterns match, information transfers may begin (Blocks 930, 940). If not, an error is detected (Block 950).

According to the present invention, redundant bus bridge systems and methods include first and second bus bridges, e.g., RAID controllers, that are operative to communicate between a first bus and a second bus via respective first and second caches and to transfer information from the first bus bridge to the second cache over a third bus, e.g., a synchronous data link between the caches, to allow recovery of data previously cached in the first cache via the second bus bridge. The second bus bridge preferably is operative to transfer information addressed to the first bus from the first bus to the second bus, e.g., to "alias" addresses normally assigned to the first bus bridge in event of a failure, disconnection or other change in status of the first bus bridge. The status may be communicated from the first bus bridge to the second bus bridge over a fourth bus connecting the first and second bus bridges. In this manner, an active/active failover capability may be provided and cached information preserved without requiring host intervention.

In the drawings and specification, there have been disclosed embodiments of the invention. Although specific terms are employed, they are used in a generic and descriptive sense only and not for purposes of limitation, the scope of the invention being set forth in the following claims. It is expected that persons skilled in the art can and will make, use or sell alternative embodiments that are within the scope of the following claims either literally or under the Doctrine of Equivalents.

That which is claimed is:

1. A fault-tolerant redundant bus bridge system for communicating between a first bus and a second bus, the system comprising:

a first bus bridge and a second bus bridge, each configured to connect between the first and second busses, said first and second bus bridges concurrently operative to communicate between the first and second busses via respective first and second caches included therein; and a third bus connecting said first and second bus bridges, wherein said first bus bridge, said second bus bridge and said third bus are operative to transfer information from said first bus bridge to said second cache.

2. A system according to claim 1, wherein said second bus bridge is operative to transfer information from said second cache to the second bus responsive to change in a status of said first bus bridge to thereby recover information cached in said first cache.

3. A system according to claim 1, wherein said second bus bridge is operative to transfer information addressed to said first bus bridge from the first bus to the second bus.

4. A system according to claim 3, wherein said second bus bridge is operative to transfer information addressed to said first bus bridge from the first bus to the second bus responsive to a change in a status of said first bus bridge.

5. A system according to claim 1, wherein said first and second bus bridges comprise respective first and second RAID controllers.

6. A system according to claim 1, wherein said first and second caches comprise respective first and second synchronous dynamic random access memories (SDRAMs), and wherein said first and second bus bridges are operative to synchronously transfer information to said second SDRAM over said third bus.

7. A system according to claim 1, wherein said first bus bridge, said second bus bridge and said third bus are operative to maintain communication between the first and second busses in the presence of a single fault in said first bus bridge and said second bus bridge.

8. A fault-tolerant redundant bus bridge system for communicating between a first bus and a second bus, the system comprising:

a conductor assembly;

a first circuit assembly connected to the first and second busses via said conductor assembly, said first circuit assembly including a first bus bridge operative to communicate between the first and second busses via a first cache included therein; and a second circuit assembly connected to the first and second busses via said conductor assembly, said second circuit assembly including a second bus bridge operative to communicate between the first and second busses via a second cache included therein, wherein said conductor assembly connects said first and second circuit bus bridges via a third bus such that said first bus bridge, said second bus bridge and said third bus are operative to transfer information from said first bus bridge to said second cache.

9. A system according to claim 8, wherein said conductor assembly comprises a backplane, and wherein said first and second circuit assemblies comprise respective first and second circuit substrates configured to releasably connect to said backplane.

10. A system according to claim 8, wherein said first and second bus bridges comprise respective first and second RAID controllers.

11. A system according to claim 8, wherein said second bus bridge is operative to transfer information from said second cache to the second bus responsive to a change in a status of said first b/us bridge to thereby recover information previously cached in said first cache.

12. A system according to claim 11, wherein said second circuit assembly is operative to monitor the status of said first circuit assembly over a fourth bus connecting said first and second circuit assemblies via said conductor assembly.

13. A system according to claim 8, wherein said second bus bridge is operative to transfer information addressed to said first bus bridge from the first bus to the second bus.

14. A system according to claim 8, wherein a respective one of said first and second circuit assemblies is operative to maintain communication between the first bus and the second bus during connection or disconnection of the other of said first and second circuit assemblies.

15. A system according to claim 8, further comprising a first power supply configured to be connected to said first circuit assembly via said conductor assembly to supply power to said first circuit assembly, and a second power supply configured to be connected to said second circuit assembly via said conductor assembly to supply power to said second circuit assembly.

16. A system according to claim 15, wherein said first and second circuit assemblies comprise first and second batteries which are operative to supply power to the first and second circuit assemblies, respectively, and wherein a respective one of said first and second circuit assemblies operate from the associated battery responsive to failure of the associated power supply.

17. A system according to claim 8, wherein said first cache comprises a first SDRAM, wherein said second cache comprises a second SDRAM.

18. A system according to claim 17, wherein said first and second circuit assemblies comprise respective first and second clock generators which produce respective first and second clock signals, and wherein said first and second circuit assemblies are operative to synchronously transfer information between said first circuit assembly and said second SDRAM in synchronism with a selected one of said first and second clock signals.

19. A system according to claim 18:

wherein said conductor assembly is configured to provide said first clock signal to said second circuit assembly;

wherein said second circuit assembly comprises:

a clock control circuit, responsive to said first clock signal, operative to determine a status of said first clock signal; and a clock synchronizing circuit, responsive to said clock control circuit, operative to produce a clock signal synchronized to a selected one of said first and second clock signals based on the determined status of said first clock signal; and wherein said first and second circuit assemblies are operative to transfer information from said first circuit assembly to said second SDRAM according to the synchronized clock signal.

20. A system according to claim 8, wherein a respective one of said first and second circuit assemblies comprises:

a first circuit substrate configured to be releasably connected to said conductor assembly, said first circuit substrate configured to receive a plurality of second circuit substrates for connecting said bus bridge of said circuit assembly to the first and second busses.

21. A system according to claim 8, wherein the first and second busses each comprise one of a Fibre Channel (FC) or a SCSI bus, and wherein a respective one of said first and second circuit assemblies are operative to communicate between the first and second busses via a PCI bus.

22. A circuit assembly for use in a fault-tolerant redundant bus bridge system that communicates between a first bus and a second bus through a conductor assembly, the assembly comprising:

a bus bridge configured to connect to the first and second busses through the conductor assembly and operative to communicate between the first and second busses via a cache included therein; and a communications circuit operatively associated with said cache and operative to transfer information from said cache to a second bus bridge through said conductor assembly.

23. An assembly according to claim 22, wherein said communications circuit is operative to transfer information from the second bus bridge to said cache for subsequent transfer to the second bus.

24. An assembly according to claim 23, wherein said bus bridge is operative to transfer the information received from the second bus bridge in response to a change in a status of the second bus bridge.

25. An assembly according to claim 24, further comprising a status monitoring circuit responsive to the second bus bridge and operative to monitor a status thereof.

26. An assembly according to claim 22, wherein said bus bridge and said communications circuit are formed on a circuit substrate configured to releasably connect to said backplane.

27. An assembly according to claim 22, wherein said bus bridge comprises a RAID controller.

28. An assembly according to claim 22, wherein said bus bridge is operative to transfer information addressed to the second bus bridge from the first bus to the second bus.

29. An assembly according to claim 22, wherein said bus bridge is operative to maintain communication between the first bus and the second bus during connection or disconnection of the second bus bridge.

30. An assembly according to claim 22, wherein said bus bridge and second communications circuit are configured to receive power from an external supply to operate said bus bridge, and further comprising a battery operative to supply power to said bus bridge responsive to failure of the external power supply.

31. An assembly according to claim 22, wherein said cache comprises an SDRAM.

32. An assembly according to claim 31, comprising:

a clock generator operative to produce a local clock signal;

a clock control circuit responsive to an external clock signal and operative to determine a status of said external clock signal; and a clock synchronizing circuit responsive to said clock control circuit and operative to produce a clock signal that is synchronized to a selected one of the external clock signal and the local clock signal based on the determined status of said external clock signal; and wherein said bus bridge is operative to transfer information to said SDRAM according to the synchronized clock signal.

33. A system according to claim 22, wherein said bus bridge and second communications circuit are formed on a circuit substrate configured to receive a plurality of second circuit substrates for connecting said bus bridge to the first and second busses.

34. A fault-tolerant method of communicating between a first bus and a second bus, the method comprising the steps of:

connecting each of a first bus bridge and a second bus bridge between the first and second busses, said first and second bus bridges concurrently operative to communicate between the first and second busses via respective first and second caches included therein, said first and second bus bridges connected by a third bus independent of the first and second busses;

receiving information from the first bus at the first bus bridge;

caching the received information in the first cache;

transferring the received information from the first bus bridge to the second cache; and transferring the information from the second cache to the second bus to recover information cached in the first cache.

35. A method according to claim 34, wherein said step of transferring information from the second cache to the second bus comprises the step of transferring information from the second cache to the second bus responsive to a change in a status of the first bus bridge.

36. A method according to claim 35, wherein said step of transferring information from the second cache to the second bus is preceded by the step of monitoring the status of the first bus bridge.

37. A method according to claim 36, further comprising the step of transferring information addressed to the first bus bridge from the first bus to the second bus via the second bus bridge.

38. A method according to claim 34, wherein the first and second bus bridges comprise respective first and second RAID controllers, and wherein said step of transferring information from the second cache to the second bus comprises the step of processing the transferred information according to a RAID level.

39. A method according to claim 34, wherein said step of transferring the received information to the second cache comprises the step of synchronously transferring the information from the first bus bridge to the second cache.

40. A method according to claim 34, comprising the step of maintaining communication between the first and second busses in the presence of a single fault in said first and second bus bridges.

* * * * *